United States Patent [19] [11] 4,303,407
Marangelli et al. [45] Dec. 1, 1981

[54] CONCENTRATED COLORING SOLUTIONS OF A BLUE TINGE BASED ON MIXTURE OF 1.4-DIALKYL-ANTHRAQUINONES FOR THE COLORING OF PETROLIFEROUS PRODUCTS

[75] Inventors: Ugo Marangelli; Giancarlo Ciocci, both of Saronno; Sisto S. Papa, Milan, all of Italy

[73] Assignee: Aziende Colori Nazionali Affini ACNA S.p.A., Milan, Italy

[21] Appl. No.: 152,087

[22] Filed: May 21, 1980

[30] Foreign Application Priority Data

May 23, 1979 [IT] Italy ............................... 22909 A/79

[51] Int. Cl.$^3$ ......................... C09B 1/16; C07C 97/12
[52] U.S. Cl. ........................................ 8/643; 260/378; 8/521
[58] Field of Search .................... 260/378; 8/521, 617, 8/643

[56] References Cited

U.S. PATENT DOCUMENTS

| | | | |
|---|---|---|---|
| Re. 16,937 | 4/1928 | Iserman et al. | 44/65 |
| 2,211,943 | 8/1940 | Wilder | 260/378 |
| 2,925,333 | 2/1980 | Thompson | 260/378 |
| 3,076,698 | 2/1963 | Orelup | 44/65 |
| 3,164,449 | 1/1965 | Buxbaum | 260/378 |

*Primary Examiner*—Winston A. Douglas
*Assistant Examiner*—Raymond K. Covington
*Attorney, Agent, or Firm*—Morgan, Finnegan, Pine, Foley & Lee

[57] ABSTRACT

The present invention relates to concentrated solutions in organic solvents of special mixtures of 1-4-dialkyl-amino-anthraquinone dyes particularly useful for the coloring of hydrocarbons. The solutions of this invention are particularly useful for the coloring of hydrocarbons obtained by distillation of crude oil such, for example, as petrol kerosene and gas oil. The invention also includes the preparation of the aforementioned concentrated solutions, including direct preparation of the solutions during the synthesis phase of the anthraquinone dyes.

5 Claims, No Drawings

CONCENTRATED COLORING SOLUTIONS OF A BLUE TINGE BASED ON MIXTURE OF 1.4-DIALKYL-ANTHRAQUINONES FOR THE COLORING OF PETROLIFEROUS PRODUCTS

BACKGROUND OF THE INVENTION

It is important that the colouring material for the colouring of hydrocarbons shall have a high drying power. As a matter of fact, the higher the dyeing power the smaller is the quantity of coloring material to be used, with a lower danger of possible deposits during storage and of residues of this colouring material in the engines.

The coloring material, in order that it may be used in the colouring of fuels, must satisfy various requirements.

(1) it must possess a high dyeing power;
(2) it must have a sufficient solubility in the fuels with or without tetraethyl lead;
(3) it must have a high degree of diffusion;
(4) it must contain little or no produce insoluble in fuels;
(5) it must leave only a minimum deposit of slags in the engine;
(6) it must have a proper fastness to light under storage;
(7) it must be compatible with additives, and shall not create combustion difficulties;
(8) it must not be extractable from the fuel by treatment with water, acid or basic solutions;
(9) it must be in a brittle but not powdery form, when in the solid form;
(10) it must be sufficiently fluid to be solubilized in organic solvents, when in the liquid form.

The use of the colouring material in the liquid form brings with it considerable advantages with respect to the powdery products, and this because of:

(a) easiness of use,
(b) rapidity of metering,
(c) a high diffusion coefficient,
(d) the absence of powders.

Anthraquinonic dyes used for the colouring of petroliferous products are quite known from the literature. (U.S. Pat. No. 2,211,943; U.S. Pat. No. 2,925,333; U.S. Pat. No. 3,164,449) but they hardly succeed in satisfying the above listed requisites and in particular the difficulties increase for the dyes used in the liquid form in which the colouring material, in order to be convenient from all points of view, must possess the following further requisites:

(11) a high concentration of dissolved dye of not less than 50% by weight with reference to the solution obtained;
(12) a high fluidity;
(13) no tendency of the dye to crystallize in the solvent;
(14) stability of the liquid mixture at low temperatures over long periods of time;
(15) low vapour tension of the liquid mixture in order to avoid the formation of crystalline clots which favor crystallization.

The use of anthraquinonic dyes as colouring material for fuels has always been limited because of their limited solubility in organic solvents.

The dyes of the anthraquinone series, known to be suited for the colouring of the fuels, show a solubility in a solvent of 10–20% by weight.

For higher percentages, of the order of 40–50% b.w., in the literature there may be found pasty products, of little or none fluidity, or also solutions with a 50%, resulting, however, at a more thorough examination, devoid of stability.

OBJECTS OF THE INVENTION

An object of this invention is to provide colouring solutions useful in the colouring of hydrocarbons which meet more of the earlier mentioned requirements than the heretofore available colouring solutions.

Another object of this invention is to provide colouring solutions useful for colouring hydrocarbons, said colouring solution comprising an organic vehicle of a blue tinge containing mixtures of anthraquinonic dyes, at a high concentration, of the order of 50–60% which mixtures satisfy the earlier listed requirements of a desirable colouring material.

A further object of this invention is that of providing a preparation process for colouring solutions, which consists in condensing hydroxy-anthraquinones with pre-chosen aliphatic amines, directly in the solvents, with the oxidation carried out "in situ" of the leucoderivatives with organic compounds, such as the nitrobenzene or products of a similar character. A still further object of the invention is to obtain greater concentrations, by following up the condensation synthesis with the distillation of the more volatile products, directly obtaining thereby solutions coloured blue, already ready for use.

Further objects of the invention will be apparent from the discussion which follows.

GENERAL DESCRIPTION OF THE INVENTION

It has been found that the objects of the invention may be realized by the utilization of special mixtures of particular dialkylamino-anthraquinonic dyes, having similar structures and having suitable molar ratios towards each other, which ratios, with respect to the single chemical individuals determine considerable and unexpected transformations in their physical and applicative characteristics.

More particularly, it has been found that single symmetric 1.4-dialkyl-amino-anthraquinonic compounds of the general formula:

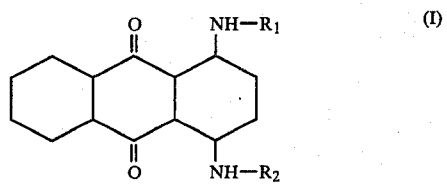

wherein: $R_1$ and $R_2$, equal to or different from each other, represent alkyl-radicals having from 4 to 20 carbon atoms in a linear or branched or cyclic chain, possibly containing from 1 to 2 etheric oxygen atoms intercalated in the aliphatic chain considered, and which display a solubility in organic solvents not exceeding 20–30%.

Quite surprisingly, however, it has been found that by using at least 6 compounds of the same general formula (I), obtained by reacting leuco-quinizarine alone or in admixture with quinizarine, with at least three different aliphatic amines corresponding to radicals $R_1$ and $R_2$, where $R_1$ and $R_2$ are linear or branched alkyls with 4–8 carbon atoms, in suitable molar ratios, one obtains unexpectedly much higher solubilities, of the order, say, of 50–60% in organic solvents such as for instance: alpha-methyl-naphtalene, beta-methyl-naphtalene, alpha-chloro-naphtalene, alpha-bromo-naphtalene, dichloro-benzol, dichloro-benzol, xylol, toluene, para-monyl-phenol and mixtures thereof in any possible ratios.

Such colouring formulations are prepared by reacting leuco-quinizarine alone or in admixture with quinizarine with mixtures of amines selected from a great number of aliphatic amines, as specified before.

The selected aliphatic amines have either linear or branched chains and contain from 4 to 8 carbon atoms.

More particularly, said formulations are prepared by reacting leuco-quinizarine alone or in admixture with quinizarine, with mixtures containing from 3 to 4 aliphatic amines, chosen from amongst the following isomeric amine groups containing from 4 to 8 carbon atoms, such as for instance:

n-butyl-amine, 1-methyl-propylamine, 2-methyl-propyl-amine;
n-pentylamine, 3-methyl-butyl-amine;
n-hexyl-amine, 2-amino-hexane, 2-amino-3-methyl-pentane;
n-heptylamine, 2-methyl-hexyl-amine;
2-ethyl-hexyl-amine, octylamine, 2-amino-octane, 2-amino-6-methyl-heptane;

in the presence or with the successive addition of the above mentioned organic solvents.

The operational ratios for the above-mentioned aliphatic amines, which are determining for obtaining the desired conditions and properties of the final colouring formulations, fall within the following molar ranges:

aliphatic amines with 7 and/or 8 carbon atoms:0.35–0.50 mols
aliphatic amines with 5 carbon atoms:0.40–0 mols
aliphatic amines with 4 carbon atoms:0.25–0.10 mols Particularly concentrated and advantageous colouring solutions may be prepared by using mixtures of the above cited amines, in the following molar ratios:

aliphatic amines with 7 and/or 8 carbon atoms:0.45 mols
aliphatic amines with 5 and/or 6 carbon atoms:0.35 mols
aliphatic amines with 4 carbon atoms: 0.20 mols.

The most suited aliphatic amines, from various points of view, are: 2-ethyl-hexyl-amine, 3-methyl-butyl-amine, n-hexylamine and n-butylamine.

The anthraquinonic dyes contained in the concentrated colouring solutions of this invention, are therefore covered by the generic formula:

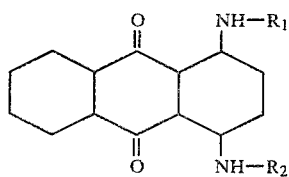

(II)

wherein $R_1$ and $R_2$, equal to or different from each other, represent alkyl radicals with either a linear or a branched chain, containing from 4 to 8 carbon atoms.

The synergic solubilizing effect of the mixtures according to this invention is such that said mixtures present themselves in an oily or semi-oily form, which allows one to obtain in the above described organic solvents solutions of high concentration.

The colouring solutions thus obtained show all the above described requisties for colouring all the fractions of the petroleum distillates, inclusive of the lubricant oils for rubber.

SPECIFIC DESCRIPTION OF THE INVENTION

The present invention in the following will be illustrated in further detail by a series of examples which shall not, however, in any way be intended as limiting the protective scope of the invention; the part and percentual values, if not otherwise indicated, are understood to be expressed by weight.

EXAMPLE 1

0.1 mol of leuco-quinizarine, 0.135 mols of 2-ethyl-hexyl-amine, 0.1 mols of isoamylamine, 0.060 mols of n-butylamine in 40 part by weight of xylol, were heated up to boiling temperature in the presence of 1 part of triethylamine or another tertiary base, for a period of 6 hours.

The leuco-1.4-dialkylamine anthraquinones present in the mixture were oxidized with 10 parts by weight of nitrobenzene, still at boiling temperature, for 4 hours. The whole was then cooled down to room temperature and was then clarified in the presence of fossil meal. Thereupon the more volatile substances were distilled off. Thereby were obtained 80 parts b.w. of a mixture of blue dyes in a liquid form at a 50% dye-concentration.

EXAMPLE 2

0.1 mols of leuco-quinizarine, 0.315 mols of 2-ethyl-hexyl-amines, 0.10 mols of pentyl-amine, 0.06 mols of 3-methylpropylamine in 80 parts of sylol were heated for 6 hours at boiling temperature, in the presence of one part of triethylamine.

The leuco-1.4-dialkyl-anthraquinones present in the mixture were then oxideized with 10 parts of nitro-benzene for 4 hours, still at boiling temperature.

Thereafter the mixture was cooled down to room temperature and was then clarified in the presence of diatomite. There were then admixed 40 parts of alpha-methyl-naphtalene. The more volatile substances were then distilled off. Thereby were obtained 80 parts b.w. of a mixture of blue dyes in the liquid form and at a 50% dye concentration.

EXAMPLE 3

0.05 mols of quinizarine, 0.05 mols of leuco-quinzarine, 0.135 mols of hexylamine, 0.100 mols of a mixture of 2-amylamine isomers, 0.06 mols of 1-methyl-propylamine in 80 parts of ligroin were heated for 6 hours at boiling temperature. This mixture was thereupon cooled down to room temperature and clarified in the presence of diatomite. To it were then added 20 parts of an alpha/beta methyl-naphtalene mixture (40:60) and 20 parts of xylol. From this mixture were then distilled off the more volatile substances.

Thereby were obtained 80 parts of a mixture of blue dyes in a liquid form and with a 50% dye concentration.

EXAMPLE 4

0.05 mols of quinizarine, 0.05 mols of leuco-quinizarine, 0.300 mols of 2-ethyl-hexylamine, in 80 parts of methanol were heated for 8 hours at boiling temperature, then cooled down and filtered.

The cake was diluted in 40 parts of alpha-methyl-naphtalene and 80 parts of sylol. Thereby were obtained 160 parts of a mixture of blue dyes in the liquid form with a dye concentration of 25%.

EXAMPLE 5

0.05 mols of quinizarine, 0.05 mols of leuco-quinizarine, 0.135 mols of 2-ethyl-amine, 0.05 mols of pentylamine, 0.05 mols of n-hexylamine, 0.060 mols of butylamine in 80 parts of xylol were heated for 8 hours at boiling temperature. Thereupon the leuco-1.4-dialkylamino-anthrquinones were oxydized with 10 parts of nitrobenzene, still at boiling temperature, for 4 hours. Lastly, the more volatile substances were distilled off. Thereby were obtained: 80 parts of mixture of blue dyes in the liquid form and with a dye concentration of 50%.

What we claim is:

1. Blue tinged colouring solutions for liquid petroleum distillates, characterized in that said solutions contain from 50% to 60% by weight of anthraquinonic compounds of the general formula:

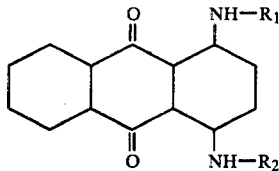
(II)

wherein $R_1$ and $R_2$, equal to or different from each other, represent linear or branched alkyl radicals having from 4 to 8 carbon atoms, in an organic diluting phase, said solutions being obtained by reacting leuco-quinizarine, alone or in admixture with quinizarine, with mixtures containing from 3 to 4 aliphatic amines having the hereunder indicated structure and molar ratios:

aliphatic amines with 7 and/or 8 carbon atoms:0.35–0.50 mols;
aliphatic amines with 6 carbon atoms:0–0.40 mols
aliphatic amines with 5 carbon atoms:0.40–0 mols
aliphatic amines with 4 carbon atoms:0.25–0.1 mols 2. Blue tinged colouring solutions for liquid petroleum distillates, characterized in that said solutions contain from 50% to 60% by weight of anthraquinone compounds of the general formula:

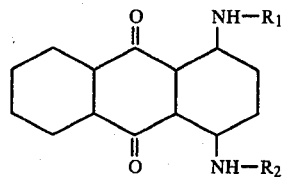

wherein $R_1$ and $R_2$, equal to or different from each other, represent linear or branched alkyl radicals having from 4 to 8 carbon atoms, in an organic diluting phase, obtained by reacting leuco-quinizarine, alone or in admixture with quinizarine, with mixtures containing from 3 to 4 aliphatic amines having the structure and molar ratios hereunder indicated:

aliphatic amines with 8 carbon atoms:0.35–0.50 mols
aliphatic amines with 6 carbon atoms:0–0.40 mols
aliphatic amines with 5 carbon atoms:0.40–0 mols
aliphatic amines with 4 carbon atoms:0.25–0.1 mols 3. Colouring solutions according to claims 1 or 2, obtained by reacting leuco-quinizarine, alone or in admixture with quinizarine, with mixtures containing from 3 to 4 aliphatic amines of the following structure and molar ratios:

aliphatic amines with 8 carbon atoms:0.45 mols
aliphatic amines with 5 and/or 6 carbon atoms:0.35 mols
aliphatic amines with 4 carbon atoms:0.20 mols 4. Colouring solutions prepared according to claim 3, characterized in that there is used the following mixture of aliphatic amines:
2-ethyl-hexylamine
n-hexylamine and/or 3-methyl-butylamine
n-butylamine.

5. Process for the preparation of colouring solutions according to claims 1 or 2, characterizied in that the diluent organic phase consists of one or more solvents chosen from amongst a group consisting of alpha- and beta- methyl-naphtalene, para-nonyl-phenol, xylol and toluene, as well as mixtures thereof.

* * * * *